United States Patent [19]

Spath et al.

[11] 4,281,519
[45] Aug. 4, 1981

[54] REFRIGERATION CIRCUIT HEAT RECLAIM METHOD AND APPARATUS

[75] Inventors: Herbert J. Spath, Clay; Glendon A. Raymond, Fulton, both of N.Y.

[73] Assignee: Carrier Corporation, Syracuse, N.Y.

[21] Appl. No.: 88,322

[22] Filed: Oct. 25, 1979

[51] Int. Cl.$^3$ .......................... F25B 7/00; F25B 27/02
[52] U.S. Cl. .................... 62/79; 62/238.6; 126/362; 237/19
[58] Field of Search ............... 62/238 E, 324 D, 79; 257/19; 126/362; 165/DIG. 12

[56] References Cited

U.S. PATENT DOCUMENTS

| 3,188,829 | 6/1965 | Siewert et al. | 62/238 E |
| 3,922,876 | 12/1975 | Wetherington, Jr. et al. | 62/238 E |
| 4,091,636 | 5/1978 | Margen | 62/238 E |
| 4,141,222 | 2/1979 | Ritchie | 62/238 E |
| 4,142,379 | 3/1979 | Kuklinski | 62/238 E |

FOREIGN PATENT DOCUMENTS 2378242 9/1978 France ........................... 62/238 E Primary Examiner—Lloyd L. King
Attorney, Agent, or Firm—J. Raymond Curtin; Robert P. Hayter

[57] ABSTRACT

Apparatus and method for exchanging heat energy between a refrigeration circuit and a hot water system. A restricted flow by-pass line is used in conjunction with a pump continuously operated with the compressor of a refrigeration system such that a continual restricted flow of water by-passes the heat exchanger when temperature conditions are such that water is not flowing through the heat exchanger.

11 Claims, 1 Drawing Figure

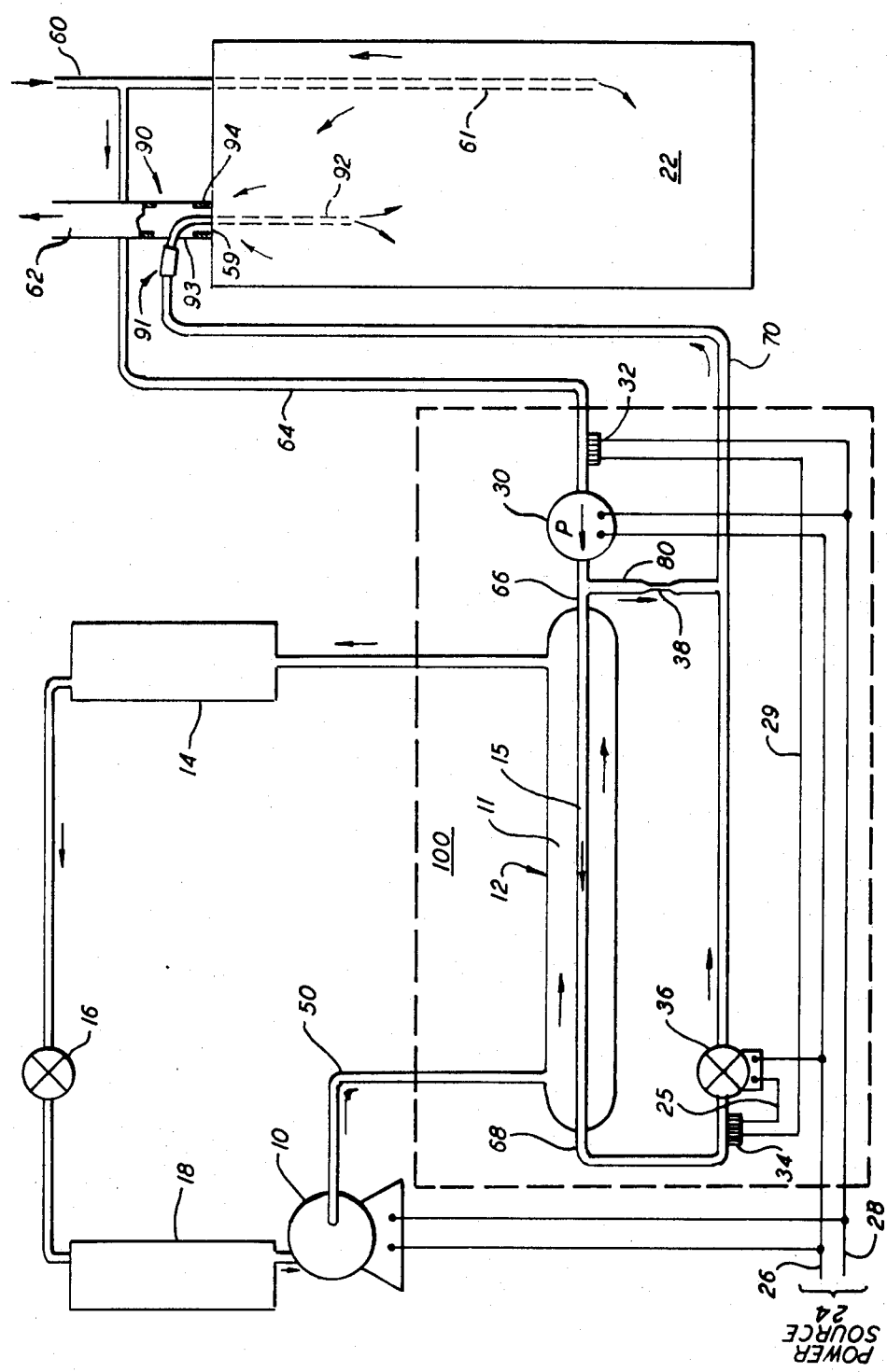

REFRIGERATION CIRCUIT HEAT RECLAIM METHOD AND APPARATUS

BACKGROUND OF THE INVENTION

1. Field of the Invention

The present invention relates to a device for transferring heat energy from a refrigeration circuit to a hot water system. More particularly, the present invention concerns a combination refrigerant desuperheater hot water heater, and a method of controlling same.

2. Description of the Prior Art

In the typical vapor compression refrigeration system various components such as a compressor, condenser, evaporator and expansion device are arranged to transfer heat energy between the fluid in heat exchange relation with the evaporator and fluid in heat exchange relation with the condenser. It is also known in conjunction with such refrigeration systems to utilize a desuperheater for removing superheat energy from gaseous refrigerant prior to circulating said refrigerant to the condenser.

In a conventional building installation a hot water heater is provided to supply heated water to an enclosure.

Many hot water heaters have a cold water inlet connected to an inlet extension pipe and a hot water outlet extending through the top of the hot water tank. Often an inlet extension pipe is connected to the cold water inlet such that the incoming water is directed to the bottom portion of the tank. In hot water tanks water is heated at the bottom of the tank and rises such that a stratified tank with relatively warm water at the top and cool water at the bottom is provided. When demand is made for hot water, water is discharged from the top of the tank at its warmest temperature and cold water is supplied through the inlet to the bottom portion of the tank.

It is known to combine a refrigeration system and hot water heating system such that the superheat of the refrigerant may be rejected to water to be heated such that this heat energy may be utilized to provide hot water.

In air conditioning systems when cooling is required heat energy is transferred from the enclosure and discharged to the ambient or some other heat sink. This heat is often wasted. With the combination system as disclosed herein it can be seen that this heat energy that is unwanted in the enclosure may be utilized to supply heat energy to water to provide heated water for various end uses. This heated water may be used for bathing, cleaning, cooking or other uses in a residence. Commercial applications include restaurants, supermarkets, process utilization and any other application wherein waste energy or excess energy from a refrigeration system may be utilized to provide some or all of the hot water heating needs.

In addition to refrigeration systems providing excess heat for heating water during the cooling season, certain refrigeration circuits are capable of reversing the cycle of operation for providing heat energy to the enclosure during the heating season. If it is desirable some of the heat provided during the heating season may also be utilized to supply hot water through the disclosed hot water heater refrigerant desuperheater.

In the specific embodiment disclosed a pump is used to circulate water from the hot water tank through the heat exchanger and back to the hot water tank when the compressor of the refrigeration circuit is energized. A temperature sensing device is located to sense the temperature of the incoming water. A second temperature sensing device is located to sense the temperature of the water being discharged from the heat exchanger. When both of these devices sense the proper condition a solenoid valve is opened such that the pump circulates water through the heat exchanger and back to the hot water tank. Should either of these switches be closed the pump will continue to operate, however, water will then flow through a by-pass line located in parallel with the heat exchanger. This by-pass line has as a part thereof a flow restriction which substantially reduces the volume flow of water through the by-pass line as compared to the flow through the heat exchanger when the valve is in the open position. The combination of the pump operating continuously with the compressor and this flow restricted bypass line acts to provide for continual sensing of the water temperature in the tank and additionally serves to reduce the overall energy input to the pump and the wear on the pump caused by continual cycling. In addition thereto by allowing for the limited flow through the by-pass line the heat energy generated by the pump, albeit a small value, may be supplied to a relatively small flow of water.

Prior art devices disclose operating a pump continuously with a compressor, the use of a solenoid valve or other valve to control the flow of water through the heat exchanger and the use of a by-pass line to circulate the flow of water around the heat exchanger. None of these patents disclose the combination of operating the pump simultaneously with benefits achieved by utilizing a restricted by-pass.

Also there is disclosed a coaxial fitting for supplying heated water from the heat exchanger to the hot water tank. It has been found that the temperature of the water flowing from the heat exchanger may exceed the normal discharge temperature of water flowing from the hot water tank to the hot water supply system. To prevent any unexpected high temperature water from traveling through the hot water system a coaxial fitting is utilized. This fitting discharges the water from the heat exchanger a predetermined depth into the top of the tank such that the water from the heat exchanger mixes partially with the water in the tank before it may be discharged out the hot water outlet of the tank into the hot water system.

SUMMARY OF THE INVENTION

It is an object of the present invention to provide a combination hot water heater and refrigerant desuperheater accessory for installation with a refrigeration circuit and a hot water system for transferring heat energy from the refrigeration circuit to the hot water system.

It is a further object of the present invention to provide a method of transferring heat energy from a refrigeration circuit to a hot water system.

These and other objects are achieved according to a preferred embodiment of the invention wherein there is disclosed a combination pump which operates simultaneously with the compressor of the refrigeration system and a restricted flow by-pass line in parallel with the heat exchanger such that in response to water temperature conditions the water is either circulated primarily through the heat exchanger or circulated around the heat exchanger through the by-pass line. Additionally, a coaxial fitting is disclosed for discharging heated water from the heat exchanger into the hot water tank such that heated water mixes with the water in the tank prior to being discharged out of the tank into the hot water system.

BRIEF DESCRIPTION OF THE DRAWING

The FIGURE is a schematic diagram of a vapor compression refrigeration system and a hot water system with the claimed apparatus such that heat energy may be transferred between the two.

DESCRIPTION OF THE PREFERRED EMBODIMENT

The embodiment described herein will be in conjunction with a vapor compression refrigeration system and a residential-type hot water tank. It is to be understood that the invention applies likewise to various types of refrigeration circuits wherein the refrigerant is superheated and additionally to various size units such as residential, commercial and industrial. Additionally, although the hot water system as described herein is appropriate for a residential application commercial and other size hot water systems would be equally suitable.

Referring now to the FIGURE there can be seen a vapor compression refrigeration system having compressor 10 connected with discharge line 50 to refrigerant conduit 11 of desuperheater 12. The refrigerant conduit 11 of the desuperheater is connected by condenser inlet line 52 to condenser 14. Condenser 14 is connected to expansion means 16 which is connected to evaporator 18 which is connected to the compressor to complete the closed vapor compression circuit.

A water system is disclosed having water inlet 60 supplying water to hot water tank 22. Water inlet 60 extends through the top of the hot water tank and has a water inlet extension 61 extending towards the bottom of the tank such that cooler inlet water may be supplied to the bottom of the hot water tank. Feed line 64 is connected at a T-intersection to water inlet 60 such that water may be supplied to preheater-desuperheater package 100 (that part of diagram within the dashed lines) from either the water inlet or the hot water tank depending upon whether or not water is being discharged from the tank.

Feed line 64 is connected to pump 30 which is connected to desuperheater inlet line 66. Desuperheater inlet line 66 is connected to water conduit 15 of desuperheater 12 which is connected to the desuperheater outlet line 68. Desuperheater outlet line 68 is connected through solenoid valve 36 to return line 70. In parallel with desuperheater 12 desuperheater outlet line 68 and solenoid valve 36 is by-pass line 80 having flow restriction 38. Flow restriction 38 may be a capillary tube or fixed orifice device which creates a pressure drop. Return line 70 is connected through joint 91 to return line extension 92 of coaxial fitting 90 such that hot water from the desuperheater may be conducted into the reservoir of water within hot water tank 22. Hot water may be discharged from hot water tank 22 through tank outlet 59 through the conduit portion 94 of coaxial fitting 90 into water outlet conduit 62 to supply the hot water system.

Preheater-desuperheater package 100 includes pump 30 connected to power source 24. Additionally, inlet thermal switch 32 and outlet thermal switch 34 are connected in series with solenoid valve 36. Compressor 10 of the refrigeration circuit is also connected to power source 24. Specifically, wire 26 is connected to compressor 10, to pump 30 and to solenoid valve 36. Wire 28 is connected to compressor 10, pump 30 and to thermal switch 32. Wire 29 connects inlet thermal switch 32 to outlet thermal switch 34. Wire 25 connects outlet thermal switch 34 to solenoid valve 36.

OPERATION

When a demand is sensed such that the refrigeration circuit is operated for supplying heating or cooling compressor 10 is energized which additionally serves to energize pump 30 and to provide power to inlet thermal switch 32. Once compressor 10 is energized hot refrigerant gas is discharged to desuperheater 12. This hot gas contains thermal energy including superheat energy, i.e. the energy rejected to cool the gas to its saturation temperature, the heat condensation (heat energy necessary to condense the gas to a liquid). In the desuperheater only the heat energy rejected by the gas being cooled to the saturated temperature is designed to be transferred to the water flowing therethrough. In condenser 14 the heat of condensation of the refrigerant is rejected to a heat transfer media in heat transfer relation therewith.

When pump 30 is energized water is circulated from either water inlet 60 or hot water tank 22 through the water inlet extension 61. If the hot water system is removing water from water outlet 62 then water from water inlet 60 may flow directly to pump 30. If no outlet water is being discharged from the hot water tank then pump 30 will act to circulate water drawn from the bottom of hot water tank 22 through water inlet extension 61 and feed line 64. Pump 30 will circulate water through the water conduit portion of desuperheater 12 when the inlet thermal switch 32 and outlet thermal switch 34 are both closed energizing solenoid valve 36. Inlet thermal switch 32 is a thermal sensing device set to open if the incoming water temperature exceeds a predetermined value such as 120° F. Outlet thermal switch 34 is a thermal sensing device set to open if the termperature of the water being discharged from the heat exchanger drop below a second predetermined value such as 140° F. This combination of thermal switches acts to prevent flow through the heat exchanger if the water in the hot water tank is already sufficiently heated i.e. the inlet water temperature is above 120° F. It also serves to prevent water flow through the heat exchanger if the water within the heat exchanger has not been sufficiently heated such that cold water would be returned to the tank. Consequently, once this temperature is over 140° F. the thermal switch closes such that that batch of water within the desuperheater may be circulated back to the hot water tank.

By-pass line 80 connecting superheater inlet line 66 and return line 70 has either formed as a part thereof or by its configuration a flow restriction. This flow restriction serves to limit the volume flow of water through the by-pass line regardless of whether solenoid line 36 is in the open position or the closed position. If solenoid valve 36 is open the pump experiences little head and pumps a preselected volume of water primarily through the heat exchanger. A small percentage of this water will flow through the by-pass and flow restriction such that not all of the water flows through the heat exchanger. However, should solenoid valve 36 be closed preventing flow through the heat exchanger then the only remaining flow path is through the restriction in by-pass line 80. Since this restriction may be an orifice or other small diameter opening the pump 30 does not generate sufficient heat to pump a large flow of water therethrough. Consequently, a substantially reduced volume flow from the volume that flows through the heat exchanger when the valve is opened flows through by-pass line 80 when the solenoid valve is closed. This reduced flow when the valve is closed serves to allow inlet thermal switch 32 to constantly monitor the temperature of the water in the hot water tank. Should the solenoid valve 36 be closed because the temperature of the water in the water tank is sufficiently high, then after either usage of tank hot water or heat loss from the tank additional heat energy is required. By constantly operating the pump inlet thermal switch 32 is able to sense when either of these conditions is reached. Additionally, the energy generated by the constant operation of the pump is transferred to the water flowing through the pump such that the small volume of water being circulated is somewhat heated as it is returned to the hot water tank.

The water being returned through return line 70 to the hot water tank passes through coaxial fitting 90. Coaxial fitting 90 is designed to be secured to tank outlet 59 at the top of hot water tank 22 and to water outlet conduit 62 supplying the remainder of the hot water system. Coaxial fitting 90 has opening 93 formed in the side wall thereof through which return line extension 92 projects. Return line 70 is connected to return line extension 92 by joint 91. The return line extension is bent within the coaxial fitting and extends coaxial to the conduit portion 94 of the fitting into the reservoir of water contained in the tank.

Without a return line extension or its equivalent the heated water from the heat exchanger would be conducted directly into water outlet conduit 62 and into the hot water system of the home. This water may be at a temperature hotter than anticipated and might provide an unexpected blast of overheated water. To avoid this problem of unexpected warmer water return line extension 92 is utilized such that the heated water from the heat exchanger is discharged into the tank some distance below the top of the tank. The length of the return line extension extending into the tank is sufficient such that there is some mixing of the water from the heat exchanger with the reservoir of water in the hot water tank prior to the hot water being conducted out of the tank. If the hot water from the heat exchanger were simply dumped into the top of the tank that hot water might remain there since the tank is stratified. Again an unexpectedly warm spurt of hot water might be conducted out the hot water system upon demand therefor. The extension of the return line serves to have the water from the heat exchanger injected into the reservoir a distance from the tank outlet enabling the water from the desuperheater to be sufficiently mixed with the water in the reservoir such that the water being discharged out of the tank outlet will not have an unexpectedly high temperature.

While the invention has been described with reference to a particular embodiment it is to be understood by those skilled in the art that modifications and variations can be effected within the spirit and scope of the invention. It is further to be understood that although the preferred embodiment is described as a residential system, principles herein are likewise applicable to commercial and otherwise larger or smaller refrigerations as well as larger or smaller hot water systems.

We claim:

1. A combination hot water heater-refrigerant desuperheater assembly for use in conjunction with a refrigeration circuit and a hot water system which comprises:
    a water inlet for receiving water to be heated;
    a refrigerant inlet for receiving refrigerant;
    a water outlet for discharging water;
    a refrigerant outlet for discharging refrigerant;
    heat exchange means for transferring heat energy between the refrigerant and the water, said heat exchange means being connected to the refrigerant inlet and the refrigerant outlet;
    pump means connected to the water inlet for circulating water through the assembly;
    first pipe means connecting the pump means to the heat exchange means;
    second pipe means connecting the heat exchange means to the water outlet;
    a valve associated with the second pipe means, said valve having an open position allowing water flow from the heat exchange means to the water outlet and a closed position preventing water flow from the heat exchange means to the water outlet;
    by-pass means connecting the first pipe means to the second pipe means allowing water to flow from the water inlet to the water outlet without passing through the heat exchange means; and
    said by-pass means including restriction means to substantially limit the flow of water through the by-pass means such that whenever the pump means is energized a flow of water passes through the by-pass means notwithstanding the position of the valve, said flow volume through the by-pass means being substantially less than the volume flow through the heat exchange means when the valve is in the open position.

2. The apparatus as set forth in claim 1 wherein the first pipe means includes:
    a discharge line connecting the heat exchange means, the by-pass means and the pump means, said discharge line conducting water from the pump means to the heat exchange means and the by-pass means.

3. The apparatus as set forth in claim 1 wherein the pump means is powered by an electric motor which is energized continuously when the refrigeration circuit is operated.

4. The apparatus as set forth in claim 3 and further including:
    a first temperature sensing means located to sense the temperature of the water at the water inlet;
    a second temperature sensing means located to sense the temperature of the water exiting the heat exchange means, and
    means for controlling the position of the valve based upon the temperatures sensed by the first and second temperature sensing means.

5. The apparatus as set forth in claim 4 wherein the valve is conected in series with first temperature sensing means and the second temperature sensing means, the first temperature sensing means being in the closed position when the temperature of the water at the water inlet is below a first predetermined value, the second temperature sensing means being in the closed position when the temperature of the water exiting from the heat exchanger is above a second predetermined value whereby when the first and second temperature sensing means are both in the closed position the valve will be in the open position permitting water flow therethrough, and if one or both of the temperature sensing means is in the open position then the valve will be in the closed position preventing water flow therethrough.

6. The apparatus as set forth in claim 1 wherein the restriction means is a fixed orifice device.

7. A refrigeration system which comprises:
a refrigeration circuit having an evaporator, condenser, expansion device and a compressor;
a heat exchanger connected to receive refrigerant from the compressor of the refrigeration circuit and to discharge refrigerant to the condenser of the refrigeration circuit;
a tank containing a reservoir of water;
means for circulating a selected volume flow per unit time of water in the tank through a flow path having the primary flow in heat exchange relation with the refrigerant in the heat exchanger and a lesser secondary flow bypassing the heat exchanger under a first set of water temperature conditions when the compressor of the refrigeration circuit is operating, and
means for circulating a substantially reduced volume flow per unit of time of water in the tank through the flow path bypassing the heat exchanger when the compressor of the refrigeration circuit is operating and when there exists a second set of water temperature conditions.

8. The apparatus as set forth in claim 7 wherein the means for circulating a reduced flow volume includes a by-pass line connected in parallel with the heat exchanger, at least a portion of the by-pass line being sized to restrict the flow therethrough and a valve located in series with the heat exchanger for preventing flow through the heat exchanger when the second set of water temperature conditions are detected and for allowing flow through the heat exchanger when the first set of water temperature conditions are detected.

9. The apparatus as set forth in claim 8 wherein the means for circulating water includes:
a first temperature sensing device for sensing the temperature of the water being circulated from the tank,
a second temperature sensing device for sensing the temperature of the water being discharged from the heat exchanger, and
control means for opening the valve to allow flow through the heat exchanger when the first temperature sensitive device senses a temperature below a first predetermined value and the second temperature sensitive device senses a temperature above a second predetermined value.

10. A method of transferring heat energy from a refrigeration circuit used to heat or cool a space upon demand to a hot water system which comprises the steps of:
energizing the refrigeration circuit on demand to circulate the refrigerant flowing within the circuit through a heat exchanger;
energizing a pump simultaneously with the refrigeration circuit to circulate water between the hot water system and the heat exchanger;
sensing the temperature of the water from the hot water system;
sensing the temperature of the water being discharged from the heat exchanger;
routing water primarily through the heat exchanger when the water from the hot water system is below a first predetermined temperature and the water being discharged from the heat exchanger is above a second predetermined temperature, and
by-passing a restricted flow of water around the heat exchanger when either the temperature of the incoming water is above the first predetermined temperature or the temperature of the water being discharged from the heat exchanger is below the second predetermined temperature, said step of by-passing serving to allow continuous but reduced flow circulation of water between the tank and the heat exchanger to allow the water temperature of the tank to be continuously monitored.

11. The method as set forth in claim 10 wherein the step of by-passing includes:
connecting a by-pass water line in parallel with the heat exchanger, said line including a restriction to limit water flow therethrough.

* * * * *